J. VELCIO.
COMBINATION PNEUMATIC CASING AND RIM.
APPLICATION FILED JAN. 21, 1922.
1,433,312.
Patented Oct. 24, 1922.
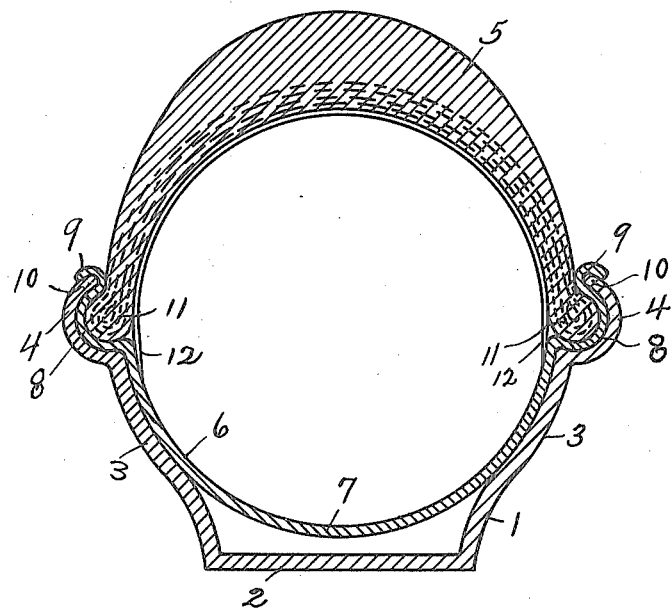
John Velcio
INVENTOR
BY
ATTORNEY Patented Oct. 24, 1922.

1,433,312

UNITED STATES PATENT OFFICE.

JOHN VELCIO, OF YOUNGSTOWN, OHIO, ASSIGNOR OF ONE-THIRD TO CHARLES A. HARPMAN AND ONE-THIRD TO DAVID A. FRAMPTON, BOTH OF YOUNGSTOWN, OHIO.

COMBINATION PNEUMATIC CASING AND RIM.

Application filed January 21, 1922. Serial No. 530,954.

*To all whom it may concern:*

Be it known that JOHN VELCIO, a citizen of the United States of America, residing at Youngstown, in the county of Mahoning and State of Ohio, has invented certain new and useful Improvements in Combination Pneumatic Casings and Rims, of which the following is a specification.

This invention relates to tires, and more particularly to pneumatic tires in combination with an outer rim and an inner reinforcing member.

The principal object is to provide a combination tire of the pneumatic type, and rim wherein the rim extends upwardly, forming approximately one half of what is ordinarily the lower half of a pneumatic casing.

Another object is to provide an inner reinforcing member in combination with an outer rim.

Another object is to provide a depending flap overlapping the beads and the clincher portions of the rim.

A still further object is to provide a hooked member at the upper edges of the inner reinforcing member.

The drawing illustrates the preferred embodiment of the invention. However, it is to be understood that in adapting the same to meeting different conditions, various changes in the form, and minor details of construction may be resorted to without departing from the nature of the invention as claimed and set forth in the drawing.

The figure is a cross section of my improved combination pneumatic casing and rim.

Corresponding and like parts are referred to in the following description; and indicated in the drawing by like reference characters.

It will be seen that I have provided a rim 1 provided with an ordinary base 2, in order to secure the rim to the wheel in any manner now known to the art. This rim 1 is provided with upwardly extending sides 3, taking the form of a lower half portion of ordinary pneumatic casings. The upper portions 4 of said upwardly extending sides 3 are provided with clinchers or securing means for a pneumatic casing 5 which is held in position by means of said clinchers or securing means. In order to reinforce the rim 1, I have provided a steel inner reinforcing member 6. The lower portion 7 of same being semi-circular in form. The upper portions 8 fitting snugly within the upper portions 4 of the rim 1.

It will be seen that this upper portion 8 is provided with hooked members 9, grasping the edges 10 of the upper portions 4 of said upwardly extending sides of the rim 1. The pneumatic casing 5 is provided with ordinary beads 11. This casing 5 is provided with flaps 12 extending downwardly and overlapping the inner portions of the beads 11, and the upwardly extending side walls 3. The object of these flaps 12 is to provide means for preventing an inner tube from being pinched or distorted by any ordinary movement of the pneumatic casing 5. Pneumatic casing 5 is constructed along ordinary lines known to the art in building tires of this class, with the exception of being approximately only one-half the circumference of such tires.

What I claim is:

In a device of the class described, a rim provided with an upwardly extending wall forming approximately one-half of what is ordinarily the lower half of a pneumatic casing, clinchers or securing means formed at the upper portions of said upwardly extending walls, an inner reinforcing member formed of steel and having the upper portions fitting securely within the clincher or securing portions of said rim, hooked members gripping the upper edge of said clincher or securing members of said rim, said inner reinforcing member being approximately semi-circular in form.

In testimony whereof I affix my signature.

JOHN VELCIO.

Witnesses:
JOHN P. MEYER,
D. A. FRAMPTON.